(12) United States Patent
Schmid

(10) Patent No.: US 9,809,361 B2
(45) Date of Patent: Nov. 7, 2017

(54) BEVERAGE CAN WITH ANTENNA FOR DATA TRANSMISSION

(71) Applicant: SEIBERSDORF LABOR GMBH, Seibersdorf (AT)

(72) Inventor: Gernot Schmid, Bromberg (AT)

(73) Assignee: Seibersdorf Labor GmbH, Seibersdorf (AT)

(*) Notice: Subject to any disclaimer, the term of this patent is extended or adjusted under 35 U.S.C. 154(b) by 0 days.

(21) Appl. No.: 15/022,735

(22) PCT Filed: Sep. 9, 2014

(86) PCT No.: PCT/AT2014/050200
§ 371 (c)(1),
(2) Date: Mar. 17, 2016

(87) PCT Pub. No.: WO2015/039151
PCT Pub. Date: Mar. 26, 2015

(65) Prior Publication Data
US 2016/0214774 A1 Jul. 28, 2016

(30) Foreign Application Priority Data

Sep. 17, 2013 (AT) ............................. A 50590/2013

(51) Int. Cl.
*B65D 55/02* (2006.01)
*B65D 17/00* (2006.01)
(Continued)

(52) U.S. Cl.
CPC ......... *B65D 55/028* (2013.01); *B65D 17/165* (2013.01); *G06K 19/07798* (2013.01);
(Continued)

(58) Field of Classification Search
CPC .............. B65D 17/165; B65D 2203/10; B65D 2517/0014; B65D 2517/0053;
(Continued)

(56) References Cited

U.S. PATENT DOCUMENTS 8,570,153 B2 * 10/2013 Sotobayashi ........ B65D 17/165
340/10.1
2005/0162277 A1 7/2005 Teplitxky et al.
(Continued)

FOREIGN PATENT DOCUMENTS

DE 10344270 A1 4/2005
WO 2014161021 A1 10/2014

*Primary Examiner* — Tho G Phan
(74) *Attorney, Agent, or Firm* — Laurence A. Greenberg; Werner H. Stemer; Ralph E. Locher

(57) ABSTRACT

A can includes an at least partially electrically conductive body having a seal region delimited by a predetermined breaking edge on a front wall. An opening element bears against the front wall and is connected to the front wall at least at one point in an initial position. When the opening element is pivoted into an opening position, the seal region tears away at the predetermined breaking edge and forms an opening for emptying the contents of the can. The opening element has a metallic basic body which has a loop with an electrical interruption at one end region. An antenna and a transponder chip which is connected to the antenna are provided. The antenna bears at least partially against and is electrically insulated from the basic body. The antenna is free of interruptions, at least partially along the loop which is electrically interrupted by the interruption.

16 Claims, 4 Drawing Sheets

(51) Int. Cl.
*G06K 19/077* (2006.01)
*H01Q 1/22* (2006.01)

(52) U.S. Cl.
CPC ....... *H01Q 1/2208* (2013.01); *B65D 2203/10* (2013.01); *B65D 2517/0014* (2013.01); *B65D 2517/0053* (2013.01); *B65D 2517/0056* (2013.01)

(58) Field of Classification Search
CPC .......... B65D 2517/0056; B65D 55/028; B65D 51/245; G06K 19/07798; H01Q 1/2208
USPC .......... 343/702, 720; 340/10.1, 572.5, 572.7, 340/572.8
See application file for complete search history.

(56) References Cited

U.S. PATENT DOCUMENTS

| | | |
|---|---|---|
| 2010/0117797 A1 | 5/2010 | Bauchot et al. |
| 2010/0283580 A1 | 11/2010 | Sheng et al. |
| 2011/0102150 A1 | 5/2011 | Sotobayashi et al. |
| 2015/0129663 A1* | 5/2015 | Schmid ................ B65D 17/165 235/492 |
| 2016/0039564 A1* | 2/2016 | Schmid ................ B65D 17/165 220/215 |

* cited by examiner

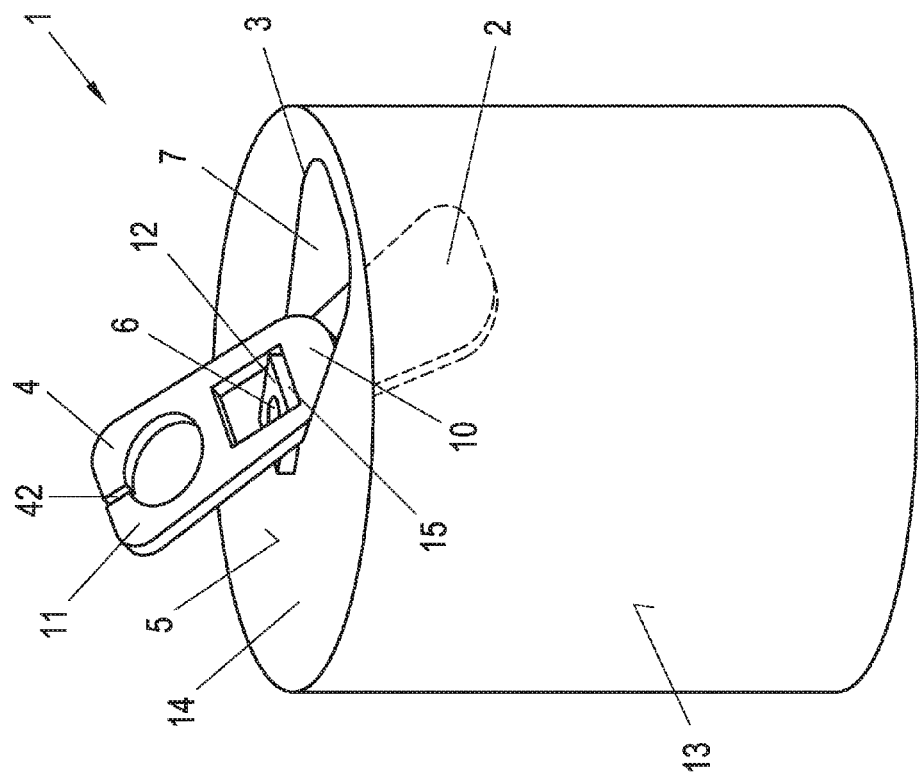
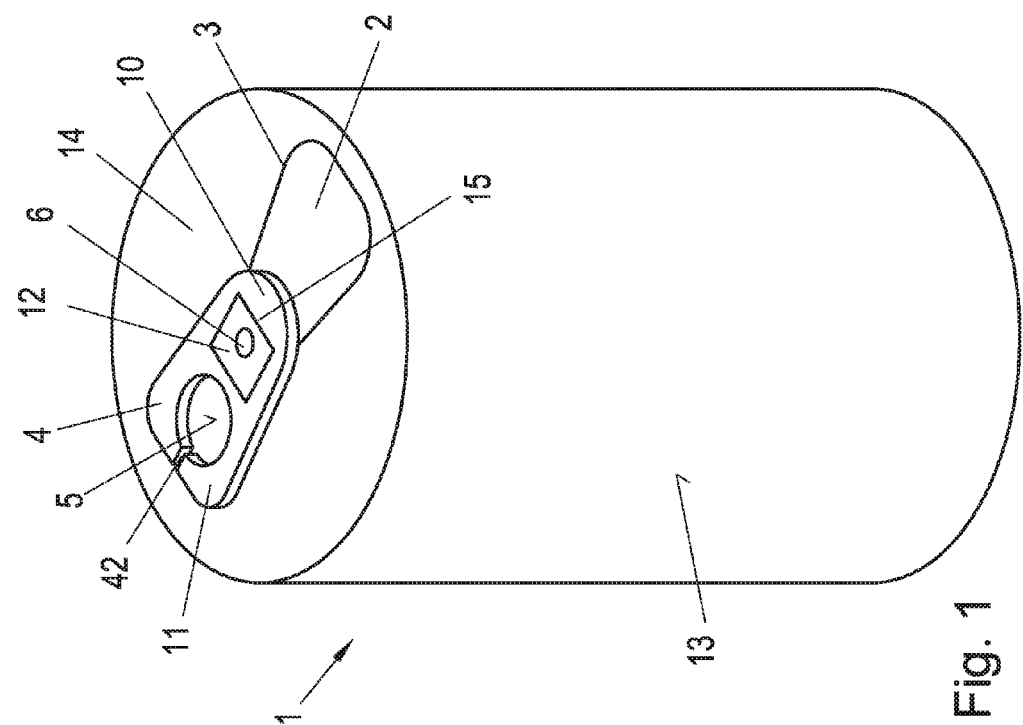

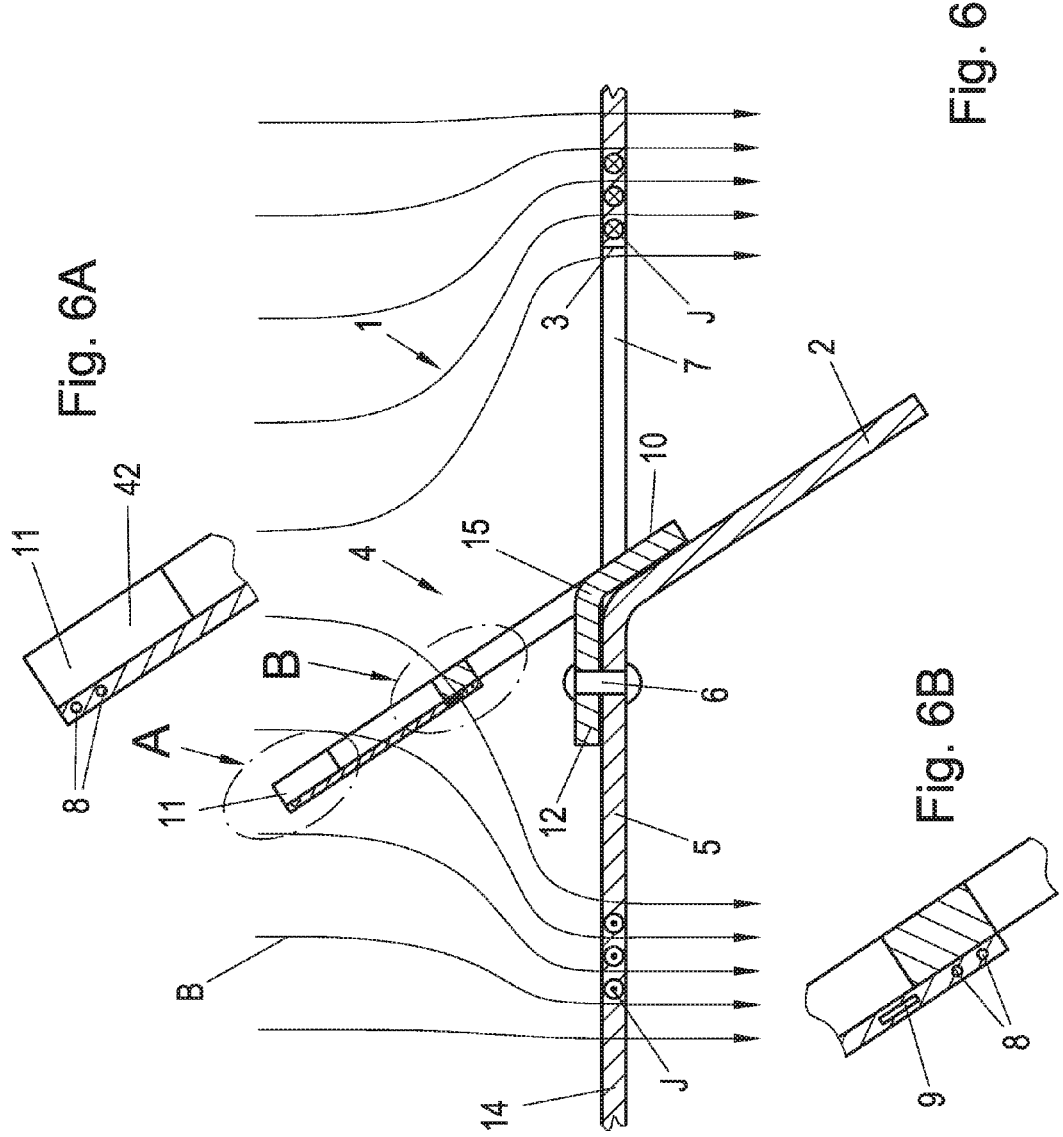

BEVERAGE CAN WITH ANTENNA FOR DATA TRANSMISSION

BACKGROUND OF THE INVENTION

Field of the Invention

The invention relates to a can including an at least partly electrically conductive body, in particular made of aluminum, wherein on a front wall of the can a seal region has been at least partly delimited by a predetermined breaking edge, and wherein the can has an opening element, wherein the opening element in its initial position at least partly bears flat against the front wall of the can and has been connected to the front wall at least at one point. When the opening element is pivoted with respect to the can from the initial position into an opening position the seal region breaks away from the predetermined breaking edge, and in the intermediate region delimited by the predetermined breaking edge an opening is formed for discharging the contents of the can.

From the prior art a large number of beverage cans are known that may be opened by means of a one-time seal, whereby in each instance a seal region is broken out of the body of the can upon opening, so that the contents of the can may be discharged therefrom.

From the prior art it is also possible to arrange RFID/NFC antennas and RFID/NFC transponders on objects, in particular also on cans, in order by means of an external data communication device to transmit data that have been stored in the transponder to the external communication device, or to transmit data from the communication device to the transponder and to store said data in the transponder.

However, no possibility is known from the prior art so that data are transmissible from a beverage can to an external data communication device exclusively when a one-time seal on the can has been opened. Such an apparatus could be used, for example, to make certain information stored in the transponder accessible only to the person who purchased the respective can. Typically, such a can may be employed advantageously for competitions in which it is required that the respective participant bought or opened the can.

BRIEF SUMMARY OF THE INVENTION

It is consequently an object of the invention to make available a can with which data are transmissible from a transponder arranged on the can to an external data communication device only when the respective can has been opened and/or, with an external data communication device on a transponder arranged on the can, data may be stored only when the respective can has been opened.

The invention achieves this object with the can of the aforementioned type including an at least partly electrically conductive body, in particular made of aluminum, wherein on a front wall of the can a seal region has been at least partly delimited by a predetermined breaking edge, and wherein the can exhibits an opening element, wherein said opening element in its initial position at least partly bears flat against the front wall of the can and has been connected to the front wall at one point at least, wherein when the opening element is pivoted with respect to the can from the initial position into an opening position the seal region breaks away from the predetermined breaking edge, and in the intermediate region delimited by the predetermined breaking edge an opening for discharging the contents of the can is formed, there is provision that the opening element exhibits a metallic basic body which exhibits at an end region a loop with an electrical interruption, that an antenna and a transponder chip linked to the antenna have been provided, that the antenna at least partly, in particular completely, bears against the basic body and has been electrically isolated with respect to the basic body, and that the antenna has been arranged free from interruption at least partly along the loop electrically interrupted by the interruption.

With a can of such a type, a wireless communication between the transponder chip arranged on the opening element of the can and an external data communication device is effectively suppressed by the electromagnetic reaction of the electric currents induced in the metallic front wall of the can on the electromagnetic field of the data communication device, so long as the opening element is located in the initial position and hence the antenna is located in the immediate vicinity of the metallic front wall of the can.

In this case it is advantageous that a communication of data between the transponder arranged on the can and an external data communication device is possible only when the can has been opened. This is achieved, in particular, by virtue of the interruption provided in the opening element, since by virtue of this no eddy currents or only insignificant eddy currents, which would impair a communication, are able to be induced in the opening element in the opened state in the region of the antenna. A communication of data is impossible in any case when the opening element is in its initial position and the can has not yet been opened.

An advantageous development of the invention, which enables an easy manufacture, provides that the antenna and/or the carrier has/have been arranged on the side of the opening element facing toward the front wall in the initial position.

An advantageous suppression of the communication is achieved if the antenna has been routed across the interruption from the one end of the loop of the opening element close to the interruption to the opposite end of the loop of the opening element close to the interruption.

In order to effectively avoid a communication between the transponder arranged on the can and an external data communication device so long as the can has not been opened, there may be provision that in the initial position the antenna exhibits a maximum spacing of less than 3 mm, in particular of less than 0.2 mm, from the wall of the can, and/or that the antenna at least partly bears against the can.

For the same purpose, alternatively or additionally there may be provision that the antenna has been arranged in such a manner that, in the initial position, electromagnetic fields that are directed toward the antenna are changed by the wall region or surface region of the can in such a manner that the coupling of electromagnetic fields into the antenna is suppressed or sufficiently weakened, so that no communication of data is possible between the transponder arranged on the can and an external data communication device.

In order to enable a communication between an external data communication device with the transponder, there may be provision that in the opening position the antenna has been lifted away and/or removed from the conductive wall region and surface region of the can and/or has been pivoted relative to the latter, and that in the opening position the antenna receives electromagnetic fields that are directed toward it in a form and intensity sufficient for wireless communication of data, and relays them to the transponder chip.

In order to effectively avoid a shielding or displacement of electromagnetic waves directed toward the antenna in the opening position, there may be provision that at a transmission frequency within the range between 100 kHz and 1000 MHz, in particular within the range from 120 kHz to 135 kHz, within the range from 13 MHz to 14 MHz or within the range from 860 MHz to 910 MHz, the specific electrical conductivity of the carrier material on or in which the antenna has been arranged is less than 1 S/m, and that the electrical permittivity of the carrier material on or in which the antenna has been arranged is less than $100*8.854*10^{-12}$ As/Vm.

In order to effectively guarantee a shielding or displacement of electromagnetic waves directed toward the antenna in the initial position, there may be provision that at a transmission frequency within the range between 100 kHz and 1000 MHz, in particular within the range from 120 kHz to 135 kHz, within the range from 13 MHz to 14 MHz or within the range from 860 MHz to 910 MHz, the wall region or surface region of the can against which the opening element bears exhibits a specific electrical conductivity of at least 10 S/m, in particular of at least $10^6$ S/m, and exhibits a magnetic permeability of at least $0.99*4*\pi*10^{-7}$ Vs/Am.

An embodiment of the invention that is particularly easy to manufacture provides that the seal region and the predetermined breaking edge have been formed on a front wall of the can.

A particularly advantageous arrangement, with which an advantageous pivoting of the opening element is possible, provides that the opening element has been connected to the can via a rivet, the opening element exhibiting a pressure region bearing against the seal region in its initial position, for pressing the seal region inward.

In order to open the can easily, in this case there may be provision that the opening element exhibits an actuating region situated opposite the pressure region, in which case the pressure region and the actuating region have been delimited from one another by the rivet and act together as a two-armed lever articulated by the rivet.

A particularly simple mechanical configuration, which enables a good pivoting of the opening element with respect to the can, provides that the opening element exhibits a connecting element which is capable of pivoting with respect to its body and which has been connected to the wall of the can by means of the rivet.

When using transmission frequencies of 10 MHz to 15 MHz, it is particularly advantageous that the antenna has been arranged in an indentation at least partly along the peripheral edge of the opening element.

BRIEF DESCRIPTION OF THE SEVERAL VIEWS OF THE DRAWING

A preferred exemplary embodiment of the invention will be presented in greater detail with reference to the following figures of the drawing.

FIG. 1 shows an embodiment of the invention in the initial position.

FIG. 2 shows the embodiment of the invention represented in FIG. 1 in the opening position.

FIG. 6 shows the electromagnetic behavior of the can and of the opening element in the opening position. FIG. 6A and FIG. 6B show details A and B from FIG. 6.

DESCRIPTION OF THE INVENTION

Figure 3:
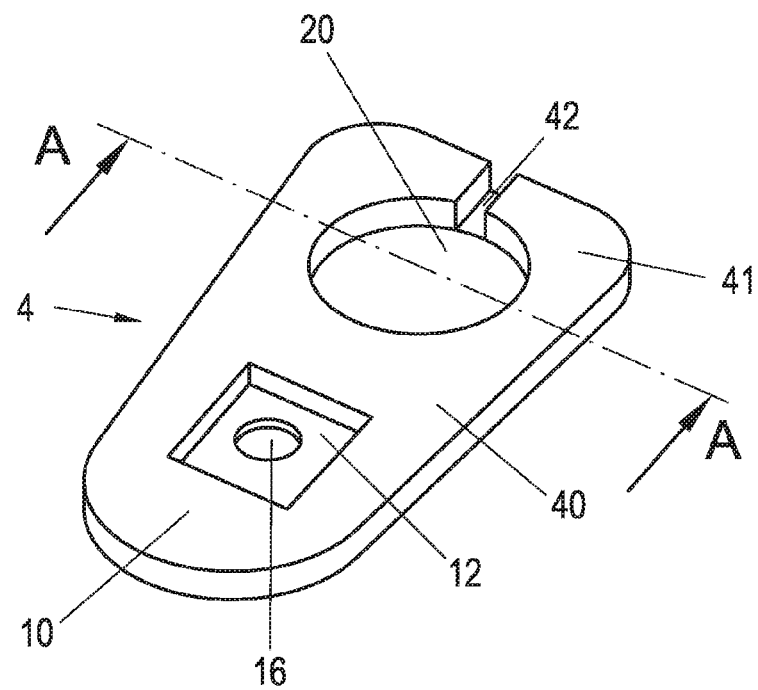
FIG. 3 shows an embodiment of an opening element 4 according to the invention.

Represented in FIG. 1 is a cylindrical can 1 according to a preferred exemplary embodiment of the invention. The body of the can 1 consists, in its entirety, of aluminum, it being possible for the can 1 to exhibit a printed decorative film on its circumferential surface 13. On the front wall 14 of the can 1 a seal region 2 has been provided which is delimited by a predetermined breaking edge 3. Furthermore, the can 1 exhibits an opening element 4 which has been connected to the front wall 14 of the can 1 via a rivet 6 penetrating a slot 16 (FIG. 3) of the opening element 4. In principle, however, it is sufficient that the wall region and surface region 5 of the can 1 that the opening element 4 adjoins brings about a sufficient reaction on an electrostatic field applied from outside in the region of the opening element 4, so that in the case of an adjacent opening element 4 on the wall region and surface region 5 no wireless electromagnetic transmission of data is possible between an antenna 8 arranged in or on the opening element 4 and an external data communication device (FIG. 3). The opening element 4 is provided with a connecting element 12 with the slot 16, which is capable of pivoting with respect to its body and which has been connected to the front wall 14 of the can 1 by means of the rivet 6 and which rests flat on the front wall 14 of the can 1. Ordinarily, the opening element 4 may be rotated about the axis of the rivet 4; in the present exemplary embodiment there is no kinetically rigid connection of the opening element 4 to the can. In the present exemplary embodiment, the opening element bears flat against the front wall 14 of the can 1.

In FIG. 2 the embodiment of the can 1 represented in FIG. 1 is represented in the opening position. In the process of opening, an actuating region 11 of the opening element 4 facing away from the seal region 2 is raised, and the entire opening element 4 is pivoted with respect to the articulation edge 15 between the connecting element 12 and the body of the opening element 4. By this means, the pressure region 10 of the opening element 4 bearing against the seal region 2 is pressed in the direction of the seal region 2 into the interior of the can 1, as a result of which the seal region 2 breaks away from the front wall 14 of the can 1 along the predetermined breaking edge 3 and enters the can 1. By this means, an opening 7 is created, out of which the contents of the can 1 may be discharged from the latter.

Figure 3A:
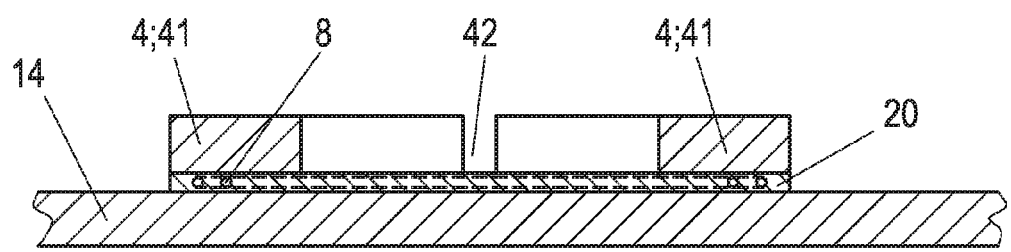
FIG. 3a shows a section extending through the opening element in the embodiment of the invention represented in FIG. 3.
Figure 4:
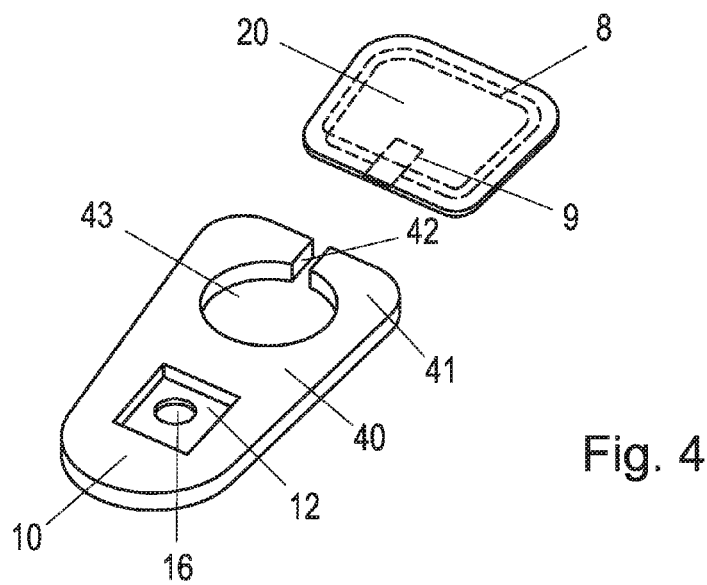
FIG. 4 shows the composition of the opening element consisting of a basic body and a carrier.

In FIGS. 3, 3a and 4, the opening element 4 is represented in detail. FIG. 3 shows an embodiment of an opening element 4 according to the invention. FIG. 4 shows the composition of the opening element 4 consisting of a basic body 40 and a carrier 20. The opening element 4 exhibits a carrier body 40 made of conductive material, in particular aluminum, wherein on the side of the carrier body 40 facing toward the front wall 14 a carrier film 20 has been arranged or adhered which at least partly bears against the opening element 4. On or within this carrier film 20 there extend the windings of the antenna 8 which has been linked to a transponder chip 9 situated on the carrier film 20. The antenna 8 extends along the edge of the lower front face of the carrier body 40, which faces toward the top wall 14 of the can 1. The region of the basic body 40 of the opening element 4 that the carrier film 20 and the antenna 8 adjoin has been designed in the form of a loop, the loop 41 not being continuous but exhibiting an interruption 42. By virtue of this interruption 42, a shielding of electromagnetic fields at the antenna 8 is avoided when the can 1 is opened and the antenna 8 is removed from the front wall 14 of the can 1. By virtue of the interruption 42, the shielding is eliminated that would exist as such by virtue of the loop 41 of the basic body 4. The width of the interruption 42—that is to say, the region in which the antenna 8 has been released from the basic body 40—may be arbitrarily small, so long as no relevant electric currents are able to form at right angles to the interruption. In practice, the width of the interruption will amount to about 0.1 mm to 5 mm.

FIG. 3a shows a sectional representation (A-A) of the opening element represented in FIG. 3 in the region of the interruption 42 in the initial position bearing against the front wall 14 of the can. The antenna 8 extends within the carrier 20 and has been electrically isolated from the basic body 40 and the loop. In the region of the interruption 42 the loop 41 exhibits two end regions which have not been connected to one another so as to be electrically conducting, so that the loop 41 of the basic body 40 has not been closed and therefore also does not displace any electromagnetic fields. The antenna 8 has been routed across the interruption 42 from the one end of the loop 41 of the opening element 4 close to the interruption 42 to the opposite end of the loop 41 of the opening element 4 close to the interruption 42. Whereas a mechanical bridging of the interruption 42 occurs by virtue of the antenna 8 and the carrier 20, the two ends of the loop situated opposite one another at the interruption 42 have not been connected so as to be directly electrically conducting. A wireless electromagnetic communication is consequently possible in the opening position via the antenna 8.

The interruption 42 is preferentially a cutout in the loop 41, which was advantageously created mechanically by separating a partial region out of an originally complete loop.

By virtue of the arrangement of the carrier 20 and also of the antenna 8 in the region of the interruption 42, an impairment of the mechanical stability of the opening element 4 caused by the interruption 42 may be prevented. Where appropriate, an electrically isolating connection between the two ends of the loop 41 may also exist in the region of the interruption 42, in order to guarantee improved mechanical stability.

Figure 5:
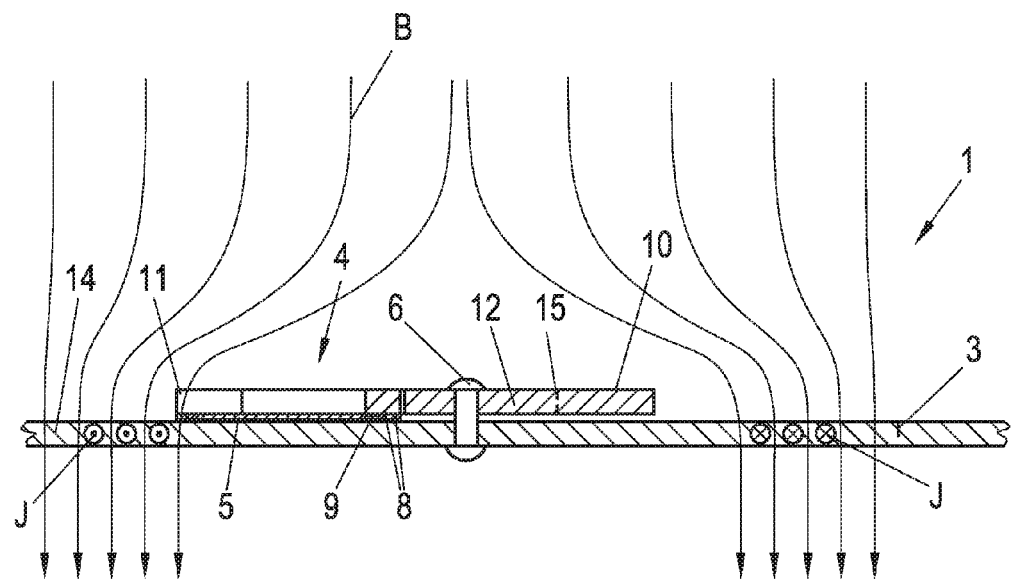
FIG. 5 shows the electromagnetic behavior of the can and of the opening element in the initial position.

The connecting element 12 of the opening element 4 exhibits a central slot 16 through which the rivet 6 has been passed (FIGS. 5, 6).

The carrier 20, which carries the antenna 8 and the transponder chip 9, advantageously takes the form of a film. The latter may have been adhesion-bonded or heat-sealed to the basic body 40 of the opening element 4. The carrier 20 may advantageously take the form of an adhesive. However, it is also possible to apply the antenna 8 and the transponder chip 8 directly onto the basic body 4.

FIG. 5 shows a section, extending through the interruption 42 of the opening element, through the can 1 and the opening element 4, and also the electromagnetic behavior of the can 1 and of the opening element 4 in the initial position. As already mentioned, the antenna 8 bears against the opening element 4 on the side facing toward the front wall 14 of the can 1. In the present exemplary embodiment, the antenna 8 bears with its full surface against the front wall 14 of the can. However, this is not absolutely essential. For the desired effect of a sufficient reaction on the electromagnetic fields directed from an external data communication device onto the antenna 8, so that a communication between the external data communication device and the transponder chip 9 via the antenna 8 is impossible, it is sufficient that in the initial position the antenna 8 exhibits a maximum spacing of less than 2-3 mm. In the initial position, magnetic fields that are directed onto the antenna 8 are then displaced sufficiently from the wall region and surface region 5 on the front wall 14 of the can 1, or the electrical properties of the antenna 8 are changed in such a manner that a communication between an external data communication device and the transponder chip 9 via the antenna 8 is impossible. The electrical connection between the transponder chip 9 and the antenna 8 is not represented in FIGS. 5 and 6.

FIG. 6 shows a section, extending through the interruption 42 of the opening element, through the can 1 and the opening element 4, and also the electromagnetic behavior of the can 1 and of the opening element 4 in the opening position. In contrast to the initial position, by reason of the pivoting of the opening element 4 with respect to the front wall 14 of the can 1 in the opening position, in the actuating region 11 of the opening element 4 the antenna 8 has been lifted away from the front wall 14 of the can 1. In this state, the opening element 4 has been distinctly electromagnetically decoupled from the wall region and surface region 5. This means that the reaction, caused by the wall region and surface region 5, on the electromagnetic field applied by an external data communication device has an effect on the antenna 8 in only very attenuated form. In this way, electromagnetic energy and also information may be transmitted by means of electromagnetic fields from an external data communication device to the transponder chip 9 via the antenna 8.

Typically, cans 1 are manufactured completely from aluminum or some other metal. However, in the present exemplary embodiment this is not necessary. In order to guarantee the sufficient effect of field displacement, it is merely necessary that the wall region and surface region 5 of the can 1 against which the opening element 4 bears is electrically and/or magnetically conductive. In the present exemplary embodiment, the wall region or surface region 5 of the can 1 against which the opening element 4 bears exhibits an electrical conductivity of at least $10^6$ S/m, in particular of at least 10 S/m. In addition, the can 1 exhibits a magnetic permeability of at least $4*\pi*10^{-7}$ Vs/Am, in particular of at least $0.99*4*\pi*10^{-7}$ Vs/Am, in the wall region and surface region 5 against which the opening element 4 bears. Aluminum, which is typically employed as material for the wall region and/or surface region of the can 1, in particular for the entire can 1, exhibits an electrical conductivity of $37*10^6$ S/m and a magnetic permeability of $(1+2.2*10^{-5})*4*\pi*10^{-7}$ Vs/Am.

In FIGS. 5 and 6, magnetic field lines B have furthermore been sketched in, in order to illustrate the special case of the magnetic coupling between a magnetic field generated by an external data communication device and the antenna 8.

In the case represented in FIG. 5 with the opening element 4 in the initial position—that is to say, with an opening element 4 adjacent to the wall region and surface region 5—eddy currents J are generated in the electrically and/or magnetically conductive wall region and surface region 5 by the magnetic field of the external data communication device, which give rise to a field displacement in the region of the opening element 4, so that the resulting magnetic field penetrating the antenna 8 is too slight to enable a wireless electromagnetic communication between the external data communication device and the transponder chip 9 via the antenna 8.

In the case represented in FIG. 6 with the opening element 4 lifted away from the wall region and surface region 5, there is a sufficiently large spacing between the antenna 8 and the wall region and surface region 5, so that the field displacement brought about by the eddy currents in the wall region and surface region 5 acts on the antenna 8 only in more greatly attenuated manner, and the antenna 8 is sufficiently penetrated by the magnetic field, so that a wireless electromagnetic communication between the external data communication device and the transponder chip 9 is possible via the antenna 8.

The invention claimed is:

1. A can, comprising:
    an at least partly electrically conductive body including a front can wall having a seal region, said seal region being at least partly delimited by a predetermined breaking edge and said predetermined breaking edge delimiting an intermediate region;
    an opening element being connected at least at one point to said front can wall, said opening element at least partly bearing flat against said front can wall in an initial position and being pivotable relative to said body from said initial position into an opening position;
    said opening element upon pivoting from said initial position into said opening position breaking said seal region away from said predetermined breaking edge and forming an opening in said intermediate region for discharging contents of the can;
    said opening element including a metallic basic body having an end region with a loop having an electrical interruption;
    an antenna and a transponder chip linked to said antenna, said antenna at least partly bearing against said basic body and being electrically isolated with respect to said basic body;
    an antenna carrier, at least one of said antenna or said antenna carrier being disposed on a side of said opening element facing toward said front can wall in said initial position; and
    said antenna being disposed without interruption at least partly along said loop being electrically interrupted by said interruption.

2. The can according to claim 1, wherein said at least partly electrically conductive body is made of aluminum.

3. The can according to claim 1, wherein said antenna completely bears against said basic body.

4. The can according to claim 1, wherein said antenna carrier is connected to said basic body, said antenna and said transponder chip being disposed on or within said antenna carrier.

5. The can according to claim 1, wherein said antenna carrier is a carrier film being adhesion-bonded or heat-sealed to said basic body, and said antenna and said transponder chip are overprinted on or within said carrier film.

6. The can according to claim 1, wherein said loop of said opening element has two opposite ends located in a vicinity of said interruption, and said antenna is routed across said interruption from one of said opposite ends of said loop to another of said opposite ends of said loop.

7. The can according to claim 1, wherein:
    said antenna carrier has a specific electrical conductivity of less than 1 S/m at a transmission frequency within a range between 100 kHz and 1000 MHz, or within a range from 120 kHz to 135 kHz or within a range from 13 MHz to 14 MHz or within a range from 860 MHz to 910 MHz; and
    said antenna carrier has an electrical permittivity of less than $100*8.854*10^{-12}$ As/Vm.

8. The can according to claim 1, wherein said antenna, in said initial position, at least one of at least partly bears against said front can wall or is disposed at a maximum spacing of less than 3 mm or less than 0.2 mm from said front can wall.

9. The can according to claim 1, wherein said body has a surface region adjoining said opening element, and said antenna, in said initial position, causes electromagnetic fields directed toward said antenna to be changed by said front can wall or said surface region to suppress a coupling of electromagnetic fields into said antenna.

10. The can according to claim 1, wherein:
    said body has a surface region adjoining said opening element;
    said antenna, in said opening position, is at least one of lifted away or removed from or pivoted relative to said conductive front can wall and said surface region; and
    said antenna, in said opening position, receives electromagnetic fields directed toward said antenna in a form and intensity sufficient for wireless communication of data, and relays the data to said transponder chip.

11. The can according to claim 1, wherein:
    said body has a surface region against which said opening element bears;
    said front can wall and said surface region against which said opening element bears has a specific electrical conductivity of at least 10 S/m or at least 106 S/m at a transmission frequency within a range between 100 kHz and 1000 MHz or within a range from 120 kHz to 135 kHz or within a range from 13 MHz to 14 MHz or within a range from 860 MHz to 910 MHz; and
    said front can wall and said surface region against which said opening element bears has a magnetic permeability of at least $(1+2.2*10^{-5})*4*\pi*10^{-7}$ Vs/Am or at least $0.99*4*\pi*10^{-7}$ Vs/Am.

12. The can according to claim 1, wherein said seal region and said predetermined breaking edge are formed on said front can wall.

13. The can according to claim 1, which further comprises a rivet connecting said opening element to said body, said opening element having a pressure region bearing in said initial position against said seal region, for pressing said seal region inward.

14. The can according to claim 13, wherein said opening element has an actuating region disposed opposite said pressure region, said pressure region and said actuating region being delimited from one another by said rivet and together acting as a two-armed lever articulated by said rivet.

15. The can according to claim 13, wherein said opening element has an opening element body and a connecting element being pivotable relative to said opening element body and being connected to said front can wall by said rivet.

16. The can according to claim 1, wherein said antenna is disposed in an indentation formed along a peripheral edge of said opening element.

* * * * *